July 21, 1936. T. A. JENKINS 2,048,266
BEER COOLING AND DISPENSING SYSTEM
Filed May 11, 1935 6 Sheets-Sheet 2
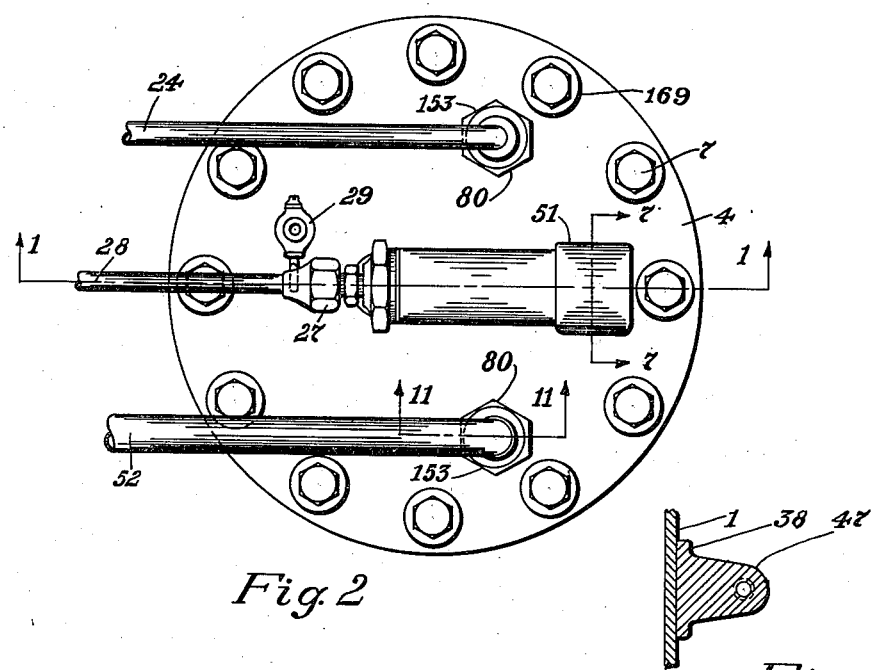
Fig. 2
Fig. 4
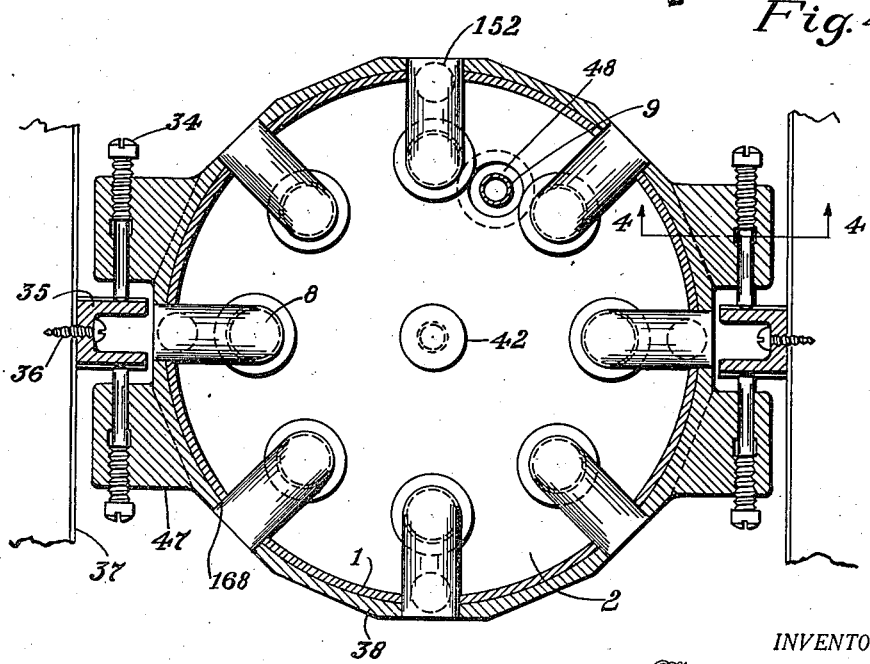
Fig. 3
INVENTOR.
Thomas A. Jenkins July 21, 1936.  T. A. JENKINS  2,048,266
BEER COOLING AND DISPENSING SYSTEM
Filed May 11, 1935   6 Sheets-Sheet 3

INVENTOR.
Thomas A. Jenkins

July 21, 1936. T. A. JENKINS 2,048,266
BEER COOLING AND DISPENSING SYSTEM
Filed May 11, 1935 6 Sheets-Sheet 4
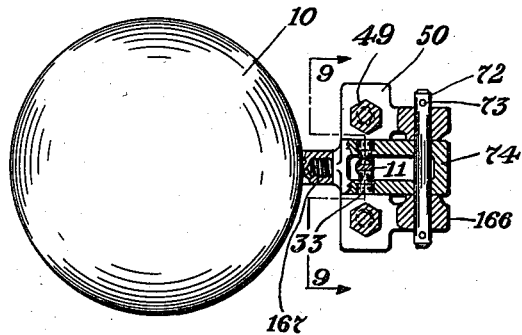
Fig. 8
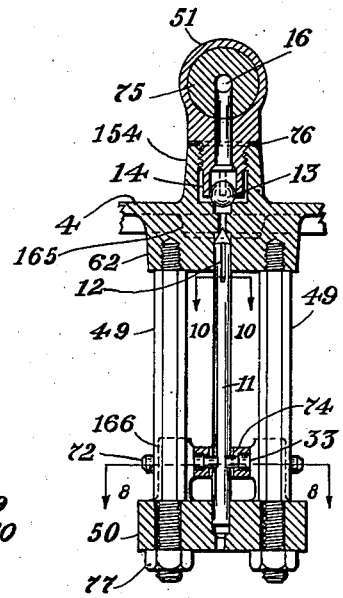
Fig. 7
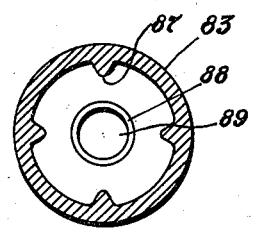
Fig. 12
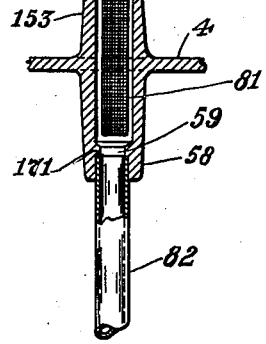
Fig. 11
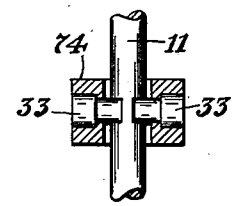
Fig. 9
Fig. 10
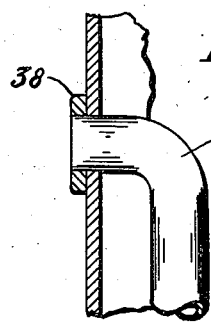
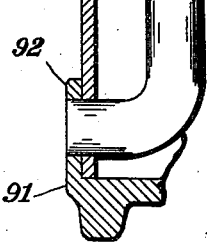
Fig. 13
INVENTOR.
Thomas A. Jenkins

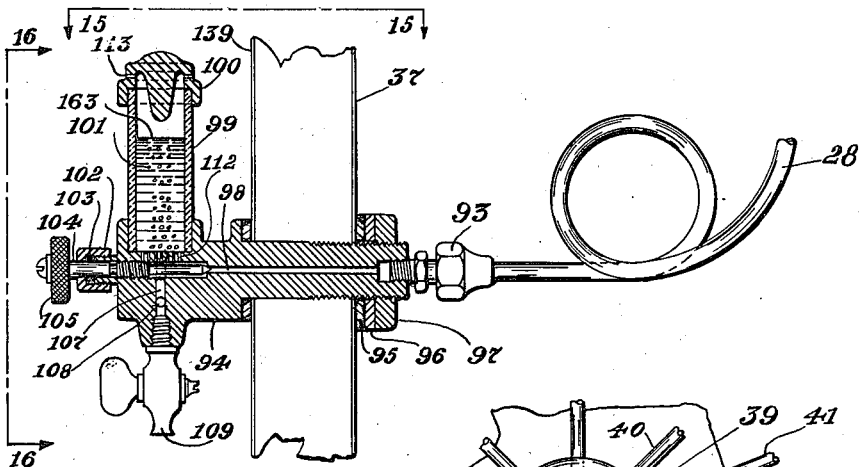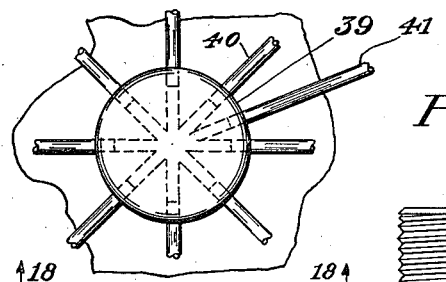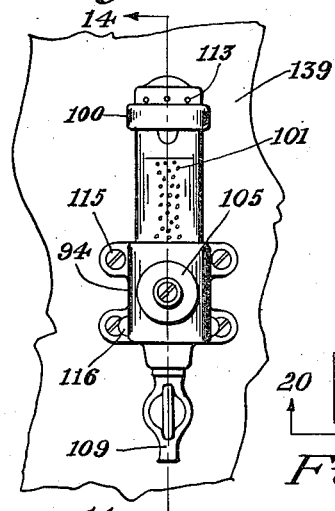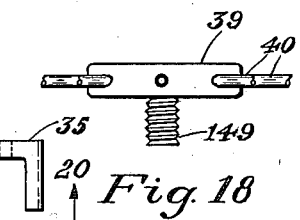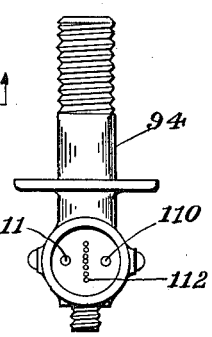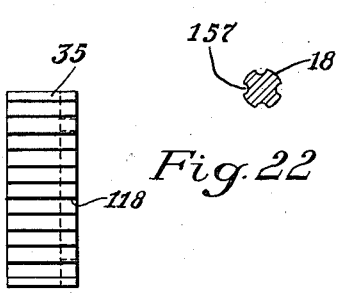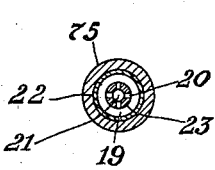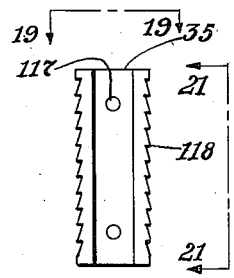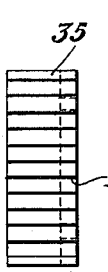

INVENTOR.
Thomas A. Jenkins

Patented July 21, 1936

2,048,266

UNITED STATES PATENT OFFICE 2,048,266

BEER COOLING AND DISPENSING SYSTEM

Thomas Alfred Jenkins, Roselle, N. J.

Application May 11, 1935, Serial No. 20,934

4 Claims. (Cl. 62—141)

This invention relates to improvements in beer cooling and dispensing systems and consists in the construction; combinations and arrangements as herein described and claimed.

The general object of my invention is the provision, in a manner as hereinafter set forth, of a beer cooling and dispensing system that is complete in arrangement; unique in design; attractive; durable; sanitary; efficient and economical in operating performance.

The basic thought and purpose of conception, as embodied in this invention, is the creation of a beer cooling and dispensing system, wherein the cooling tank is simple; the means for cooling highly efficient and the entire system complete in function and sanitary throughout. Means for filtering the beer are practical in every sense and perform the important function of protecting various valve protecting elements. Means for controlling pressure; retaining gases and for flushing and emptying the entire system during cleaning periods are provided. The fundamental principles of this invention have actually been put through a practical test, results observed and the invention thus brought to the point of conclusion, as is embodied in the specification and claims of this application.

The invention will be best understood from a consideration of the following detailed description, taken in connection with the accompanying drawings, forming a part of this specification, with the understanding that the invention is not confined to any strict conformity with the showing of the drawings, but may be changed and modified, so long as such changes and modifications make no material departure from the salient features of the invention, as expressed in the appended claims.

In the drawings:—

Figure 2 is a plan of the top of the tank, taken at line 2—2 of Fig. 1. The cooler walls and other projections have been eliminated for explicit reasons.

Figure 3 is a sectional view, taken along line 3—3 of Fig. 1, showing a reinforcing band or ring around tank cylinder and means for rigidly fastening tank in a cooler box, to prevent flotation when tank is empty.

Figure 4 is a sectional view, taken along line 4—4 of Fig. 3, showing a lug for holding clamp screws.

Figure 7 is a sectional view, taken along line 7—7 of Fig. 2, showing needle valve and means for supporting component parts thereof.

Figure 8 is a sectional view, taken along line 8—8 of Fig. 7, showing float and arm assembly and means for supporting same.

Figure 9 is an enlarged sectional view, taken along line 9—9 of Fig. 8, showing pivots and needle valve assembled.

Figure 10 is a sectional view, taken along line 10—10 of Fig. 7.

Figure 11 is a sectional view, taken along line 11—11 of Fig. 2, showing filter and check valve of beer inlet line of tank.

Figure 12 is a sectional view, taken along line 12—12 of Fig. 11, showing guides or ribs for centering ball element of check valve.

Figure 13 is a sectional view of tank body fragment, showing a second method of arranging cooling tubes. In this view the tube is bent at both ends, whereas in Fig. 1 the tubes are bent at the upper end only.

Figure 14 is a sectional view, taken along line 14—14 of Fig. 16, showing empty beer keg or container indicator.

Figure 15 is a plan view, taken along line 15—15 of Fig. 14, showing body of indicating element with all component parts eliminated for explicit reasons.

Figure 16 is a view, taken along line 16—16 of Fig. 14, showing empty beer keg or container indicator.

Figure 17 is a bottom view, taken at line 17—17 of Fig. 1, showing arrangement of a plurality of tubes, used for directing air to cause agitation of water or refrigerant contained in cooling tubes of beer tank.

Figure 18 is a view, taken at line 18—18 of Fig. 17, showing a side arrangement of agitating tube hub.

Figure 19 is a plan view of clamping bracket, taken at line 19—19 of Fig. 20.

Figure 20 is a front view of clamping bracket, taken at line 20—20 of Fig. 19.

Figure 21 is a side view of clamping bracket, taken at line 21—21 of Fig. 20.

Figure 22 is a transverse section of valve plunger 18, as in Fig. 1 and shows a plurality of grooves 151, which serve as passageways for escaping air.

To avoid confusion a sectional line has been eliminated.

Figure 23 is a transverse section of relief valve, taken through a plurality of intersecting holes 20, the view being in the direction of valve end or towards passageway 16. To avoid confusion a sectional line has been eliminated.

Figure 24:
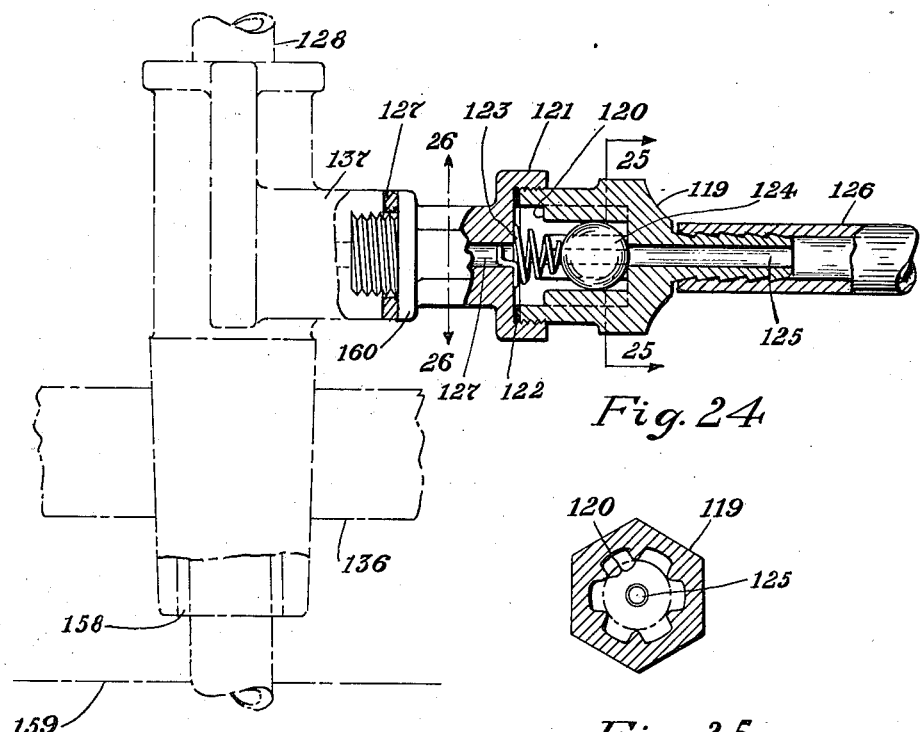

Figure 24 is a sectional view of a check valve, through which air passes into a beer keg. It functions in preventing a drop in keg pressure, in the event of a momentary reduction of pressure at the source of supply.

Figure 25:
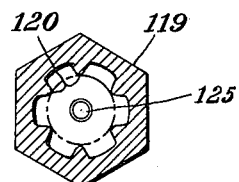

Figure 25 is a sectional view, taken along line 25—25 of Fig. 24 and shows a plurality of guides or ribs for centering the ball element of check valve.

Figure 26:
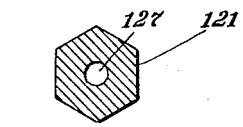

Figure 26 is a sectional view, taken along line 26—26 of Fig. 24, showing a plurality of sides to be utilized in applying a wrench when fastening valve to a beer keg bung.

Figure 27:
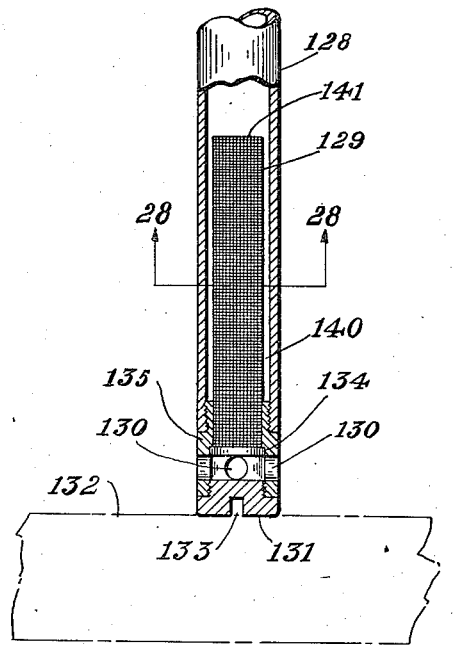

Figure 27 is a sectional view of a beer tap rod, showing a tubular shaped filtering screen in a removable ferrule, which serves to prevent sediment or other foreign matter entering the beer line and avoids frequent removal of filter screen from beer tank cover.

Figure 28:
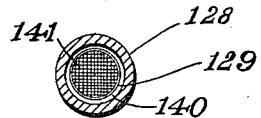

Figure 28 is a sectional view, taken along line 28—28 of Fig. 27, showing a tubular shaped filter screen in a tap rod with surrounding clearance space through which beer flows.

In the design of this beer cooling and dispensing system, it is well to note that it is composed of several component parts or elements that are connected by pipe lines and it may have the appearance of several separate items having independent functions, however the fact is that any system through which beer is handled, must be in a state of completeness and all component elements must cooperatively function, in order that satisfactory results can be obtained. If any of the several component elements of this system fail to function, such failure will be readily apparent when the dispensing faucet is placed in operation. From the beer keg or container; through the system to the dispensing faucet, every complementary element of the outfit must work cooperatively in order that desired service may be rendered.

Referring now to the drawings in detail, like numerals of reference indicate corresponding parts throughout the several views.

Figure 1:
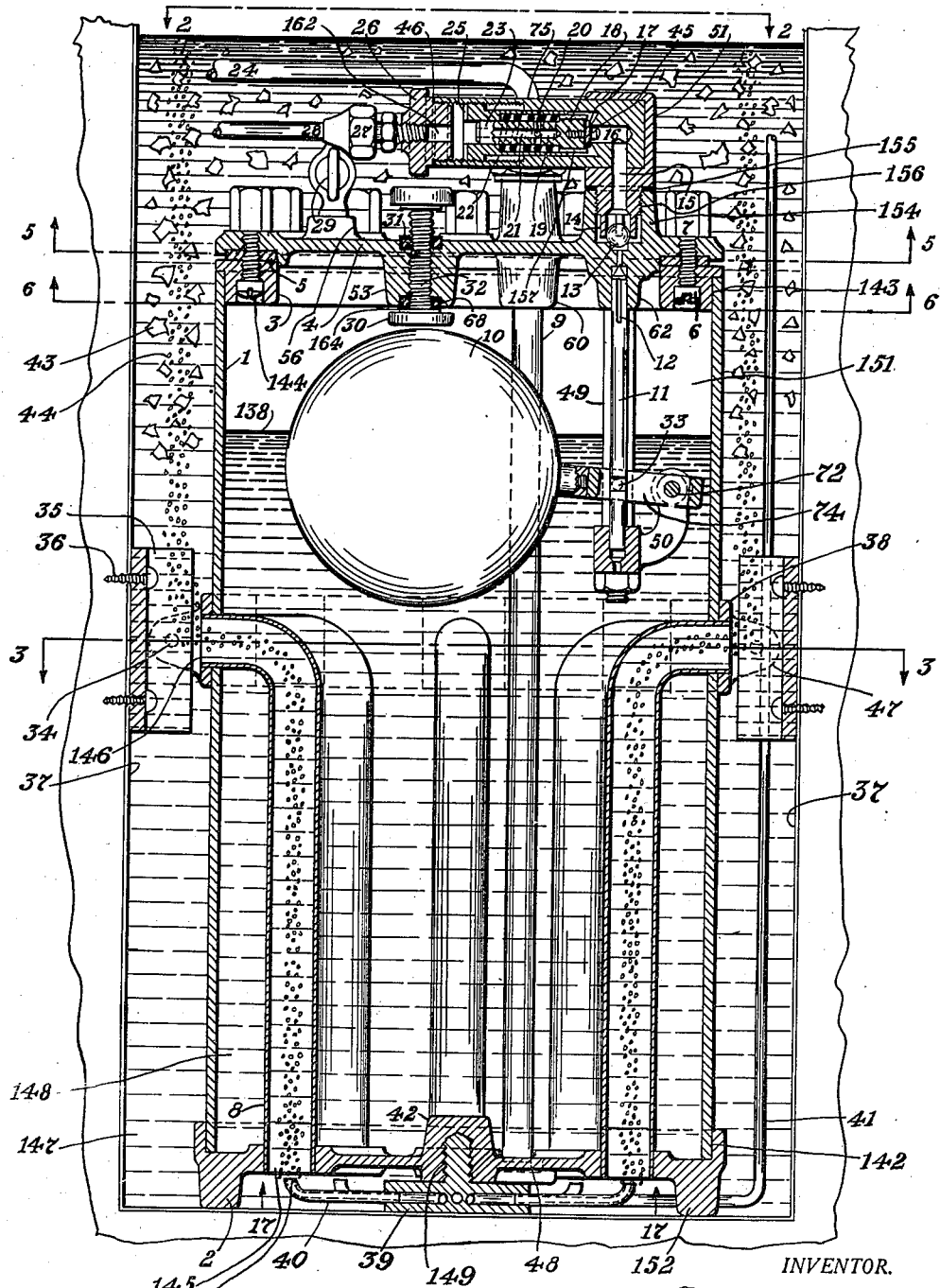
Figure 1 is a sectional view, taken along line 1—1 of Fig. 2, with an indication of the cooler box with water and ice briefly illustrated.

In Fig. 1 is a sectional view, through the beer cooling tank; combination needle and relief valve and other essential component parts. Numeral 1 is the cylinder or body of the tank proper. Numeral 2 is the bottom of the tank. Numeral 3 is a clamp ring, which is fastened to tank cylinder 1 by the use of solder as at 143. The bottom element 2, is also fastened to tank cylinder 1 by the use of solder as at 142. Numeral 4 is the tank cover and numeral 5 a gasket. Cover 4 is clamped to clamp ring 3, by means of studs 6 and cap nuts 7. The stud heads 6, are recessed in corresponding holes in clamp ring 3 and are then soldered in fixed position, as at 144. Gasket 5 is retained between two raised surfaces or circular walls 66 and 67, as in Fig. 5 which clearly shows said walls and Fig. 1 which shows gasket assembled. This arrangement prevents blowing out of the gasket when pressure is applied. The raised surface or circular wall 67 extends past the depth of gasket 5 and continues a suitable distance below the upper surface of ring 3, into a corresponding center hole of said ring as shown in Figs. 1 and 3, this attributes to effecting airtight relations between cover 4 and clamp ring 3, when in assembled position. Numeral 8 is one of a plurality of cooling tubes, through which cold water circulates and thus rapidly absorbs heat units from beer contained in cooling tank. The level of said beer is indicated at numeral 138, Fig. 1. Cold water 147 enters the cooling tubes at the bottom, as at 145 and passes out on the side or exterior surface of tank cylinder, as at 146. The beer as at 148, surrounds the cooling tubes 8. A plurality of tubes 8 are used and they are of small diameter, which is very efficient, in that a substantial cooling area is provided and the volume of beer space lost in the tank is small. The tank as a whole is submerged in cold water, which is contained in an insulated cooler box, the walls of which are indicated at 37. The cooling water is maintained at a low temperature, by means of cracked ice as at 43 or by the use of mechanical refrigeration apparatus. In either case, the water bath is utilized. The circulation of the water depends in general, on the physical function of temperature change, in that warm water flows to the top, while cold water sinks to the bottom. This is a physical fact. To increase the circulation of water through the cooling tubes 8, a plurality of small tubes 40, are assembled in a manifold hub 39, which manifold hub is fastened to the bottom 2 of the tank, by a threaded spud of integral portion of the manifold hub 39, as at 149. A supply of air enters tube 41, which is attached to manifold hub 39, as shown in Fig. 17. From the manifold hub 39, air passes through the plurality of tubes 40 and out at the aperture 150 thereof. As the apertures 150 are aligned concentrically with the lower open ends of cooling tubes 8, the air naturally flows up through cooling tubes 8 and passes out at the exterior surface of tank cylinder, as at 146. It continues moving through the cooling water until the top or level of same is reached. This movement of air causes agitation and effects an increase in the circulation of the cooling water 147. A small flow of air is sufficient and the method is less costly than resorting to the use of propellers or other such mechanical agitating elements. Also there is nothing to get out of order in this arrangement. Air has to be supplied to the system for pressure, therefore it is only necessary to tap into the source of air supply, in order to place said system in operation. Another arrangement of cooling tubes is shown in Fig. 13, in which element 90 is equivalent to 8 of Fig. 1, the difference being that element 90 is bent at both ends, whereas element 8 is bent on one end only. Numeral 38 is the same in both cases, as shown in Figs. 1 and 13.

In Fig. 13, numeral 92 is an extended wall of bottom 91, which is the same as bottom 2, with the exception of extended wall 92, which is necessary to provide additional fastening material, for the lower bend of cooling tube 90. Both cooling tube arrangements are identical in function and effect, the use of either is a matter of choice or convenience. I have indicated both methods, so that the purpose of my invention will not be defeated by someone taking advantage of the slight change, as the drawings indicate.

In Fig. 1, numeral 35 indicates a clamping bracket, shown in detail in Figs. 19, 20 and 21. Two brackets are used with each cooling tank. The brackets 35 are fastened to the interior surfaces of the cooler box, as at 37, by means of screws 36. Lugs 47, which are an integral part of ring 38, carry screws 34, which clamp brackets 35, having serrated sides and thus securely fasten the tank into cooler box. This is very important, in that the buoyancy of the tank when empty, has sufficient power to loosen connections of the inlet, outlet and indicator pipe lines, therefore the tank must be rigidly secured in the cooler box, so as to avoid interruption of service and consequently loss of beer. Numeral 9 is the outlet tube and is fastened to cover 4, by soldering in a corresponding hole in boss 60. Tube 9 extends to the bottom of tank and drops slightly below the general surface of the tank bottom element 2 and is suspended in a recess 48, shown clearly in Fig. 3. The purpose of this arrangement is to enable complete emptying of the tank, particularly during cleaning periods. It is necessary that tube 9 be suspended above a bottom surface, in order that beer can be forced out through same. As an example, if tube 9 was suspended above the general surface of the tank bottom 2, for a distance of one inch, a quantity of liquid slightly less than one inch deep, would always remain in the tank, as air will flow out of the tank at the bottom, as soon as it has reached a level with the aperture of tube 9, consequently after cleaning the tank, clear water or flushing solution practically one inch deep, would remain in the tank and mix with the first tank full of fresh beer. With a small recess in the bottom element 2, this condition is practically eliminated. In having the outlet tube 9, extend to the extreme bottom of the tank, beer having coldest temperature is drawn out. Tube 9 is connected to a pipe line 24, through a boss on the exterior or upper surface of the cover 4, concentrically formed over boss 60. A sectional view of the upper threaded boss, to which pipe line 24 is fastened, is shown in Fig. 11 at 153. The upper section 153, of both inlet and outlet bosses are identical.

In Fig. 11, numeral 80 is a coupling nut; 70 is a washer; 78 is a sleeve and 52 is block tin tubing or the like.

In Fig. 1, outlet pipe line 24 continues to a dispensing faucet, which is mounted on the exterior surface of a cooler box. Said faucet is not indicated, as it is generally understood and is a standard commercial product, with the exception that the passageway therein is smaller than that used in the standard product. The passageway in outlet pipe line 24, practically corresponds with that in the faucet. The passageways in the faucet and outlet pipe line 24 are smaller than that in inlet pipe line 52, as shown in Fig. 2 by general proportion. The small diameter of passageways in the faucet and outlet pipe line 24, curtails the flow of beer when dispensing and thereby controls the foam of beer. It is also worth noting that by having an inlet passageway larger than an outlet passageway, the supply of beer in the tank is continuously replenished, while beer is being dispensed. Fig. 1, numeral 10 is a float and 74 is a float arm. Pivots 33, which are fastened to float arm 74, raise and lower the valve needle 11, through the buoyancy of float 10 in the case of raising and gravity in the case of lowering. Bracket 50 supports float arms 74, through pin 72. Bracket 50 is secured in position by tie rods 49. Valve needle 11, has a plurality of grooves 12, through which air passes when the valve needle 11 is open. Numeral 62 is a boss, formed integral with cover 4. On each end, it has provisions for receiving threaded shanks of tie rods 49 and in the center thereof is a valve opening, with a seat for valve needle 11. On the exterior surface of cover 4, concentrically arranged over valve opening in boss 62 is a boss 154, with a threaded hole, into which is fastened, a threaded shank of the relief valve. At 155 is a gasket. Relief valve threaded shank 156, has integrally formed at the end thereof, a plurality of extended sections in the form of guides, against which ball 13 rolls or slides. Said relief valve, designated as a whole by numeral 51, has a body 75 with a passageway 16, which connects with a vertically formed passageway 15, in threaded shank portion thereof. At the open end of passageway 16, is formed a valve seat, against which valve element 17 closes. Valve element 17 is fastened to plunger 18, by means of screw 45. Plunger 18 has at the valve element end, a plurality of grooves 157, through which relieved air passes. A sectional view of air relieving grooves or passageways is shown clearly in Fig. 22. Plunger 18 has a hollow shank 23, with a plurality of intersecting holes 20, through which relieved air passes. Plunger shank 23, slides in a corresponding hole in adjusting and retaining sleeve 22. Said sleeve 22, has a slot 25, for obtaining adjustments of coil spring, by means of a screwdriver. The open end of valve body 75 is threaded for a certain distance. The large end of sleeve 22 is threaded and corresponds to the threaded section of body 75. Sleeve 22 has a shoulder at one end, against which rests a coil spring 19, which said spring surrounds hollow shank 23 and which is encased by a tube like extension forming an integral part of sleeve 22. One end of coil spring 19 rests against a shoulder, which is an integral part of plunger 18. Numeral 26 is a valve cap, with a threaded hole for receiving a flared coupling 27, which connects indicator pipe line 28 to the relief valve. Sleeve 22 provides a centering means for plunger 23 and plunger body 18; an abutting shoulder for one end of coil spring 19 and means for adjusting the tension of said coil spring, in the provision of a threaded end, which screws into correspondingly threaded body 75. Adjustments made through sleeve 22 will remain fixed, due to the mechanical arrangement of valve elements.

To make the functional description of this system explicit, it is necesasry to refer to Fig. 24, in which 136 indicates the top of a beer keg and 132 the bottom of a beer keg. Numeral 159 is a dividing line, below which is beer and above which is air. Numeral 128 is a tap rod, which passes up through a bung 137. The top of tap rod 128, which is not shown, has a stop cock and a coupling unit, to which inlet pipe line 52 shown in Figs. 2 and 11 is attached. In the upper portion of bung 137, tap rod 128 fits tight, while the lower portion of bung 137 has a clearance space 158, surrounding tap rod 128. Check valve, designated as a whole by numeral 160 in Fig. 24, is fastened to bung 137. Air hose 126, leads to a source of supply. Air in hose 126 passes through opening 125 and due to pressure, pushes past ball 124. Coil spring 123 exerts sufficient pressure against ball 124 to keep it pressed against seat. The coil spring 123 is self centering, due to the arrangement shown. The ball 124 is kept concentric with valve seat, through a plurality of guides or ribs 120, shown clearly in Fig. 25. In Fig. 24, numerals 122 and 127 are gaskets. The check valve as a whole indicated by 160, was designed exclusively for this beer cooling and dispensing system. Continuing with the movement of air, after it has forced ball 124 open, it passes on through bung 137 and enters beer keg through clearance space 158. The pressure of air forces beer out of the keg. The check valve 160, prevents a drop in keg pressure.

In Fig. 27, beer is forced out through a plurality of holes 130, in tap rod 128. Numeral 131 is a plug and 133 a slot for removing the said plug when necessary. Numeral 135 is a removable ferrule, which contains a tubular shaped filtering screen 129. Numeral 134 is a rim of the filtering screen 129.

Fig. 28 shows a section through tap rod 128. Numeral 141 is the bottom of filtering screen 129 and 140 is a space surrounding same, through which beer passes out into the beer line. The filtering screen 129 prevents foreign matter entering the beer line. The beer passing through tap rod 128 continues into pipe line 52, shown in Figs. 2 and 11.

In Fig. 11, the beer has to pass through another filtering screen 81, which is practically a duplicate of filtering screen 129, shown in Fig. 27. Numeral 52 is a beer line; 78 a sleeve and 80 a coupling. Numeral 79 is a gasket. Numeral 82 continues the passageway for beer entering line 52. The beer passes through to 89, then lifts ball 84 from its seat and passes into cooling tank. Check valve indicated as a whole by numeral 161, prevents a loss of pressure in the cooling tank, when changing to a new keg of beer. The ball 84 is kept concentric with valve seat by a plurality of guides or ribs 87, which are integrally formed with check valve body as shown in Fig. 12. This valve is distinctly adaptable for use in this beer cooling and dispensing system. It is designed with sanitary views, simple in construction and has a minimum of valve seating surface, to prevent sticking of valve element, due to sugar in beer. So far the description in general concerns the passage of beer from the keg to the cooling tank. It is well to note the purpose of two filtering screens, 129 in Fig. 27 and 81 in Fig. 11. Filtering screen 129 in Fig. 27, has the open end at the bottom, this allows sediment to drop down when pressure is removed. Same occurs when changing to a new keg of beer. In the case of filtering screen 81 as shown in Fig. 11, the top is open. To clean filtering screen 81, it is necessary to interrupt service, as same must be removed. The two filtering screens are therefor essential. The filtering of beer before it enters the cooling tank is an important function. If sediment passes into the cooling tank and finally enters the needle valve chamber or lodges on the check valve seat, it will be necessary to open the cooling tank, in order to correct the condition.

The transferring of beer from the keg to the cooling tank has now been covered. Referring to Fig. 1, the beer in cooling tank reaches a certain level, as indicated by numeral 138. Above that level, air is contained as indicated by numeral 151. The volume of air remaining in cooling tank, is governed by the needle valve float. Said air 151 acts as a cushion against shock, when dispensing faucet is opened. Under proper conditions, it prevents moisture entering relief valve and it serves as a means for an indicating signal when a beer keg is empty, as will be described later on. Beer in the natural state, contains a certain amount of $CO_2$ and it is essential that the $CO_2$ be kept in solution. To accomplish this, certain pressures must be maintained, which correspond with certain pressures must be maintained, which correspond with certain temperatures. For instance, $CO_2$ escapes from beer as the temperature increases. For instance, the ideal temperature of beer for serving should be between 42 and 45 degrees Fahrenheit. To keep the $CO_2$ in solution when beer is between 42 and 45 degrees temperature, requires a pressure ranging from 15 to 18 pounds. As the temperature rises, the pressure must be increased, that is to keep the $CO_2$ in solution. To accomplish the maintenance of essential pressure, a combination needle and relief valve has been provided. The valve needle 11, is raised through buoyancy power of float 10, which exerts pressure through float arms 74, which carries pivots 33. The pivots 33, fit into cutouts in needle 11. The cutouts are shown distinctly in Fig. 9. Pivots 33 lift the needle 11, through buoyancy of float 10 and lowers same through gravity thereof. The leverage arrangement of float 10 and arm 74, exerts considerable pressure on needle 11, which in turn effects a tight closing at the needle point and valve seat. Air passes by way of needle valve, through a plurality of grooves 12. Relief valve, which is indicated as a whole by numeral 51, is set to relieve at a predetermined pressure. Assume that relief valve 51 is set to relieve at a pressure of fifteen pounds. The keg pressure must of necessity, be higher than that at which the relief valve is set. This is necessary because the hydrostatic weight of the beer in pipe line and the resistance of said pipe line, also other elements must be offset. In starting the system, beer is forced by air pressure, into the cooling tank. A certain amount of excess pressure over that required to offset the hydrostatic weight of beer and resistance of pipe line and other elements is necessary, in order to keep the relief valve open, until beer flowing into cooling tank has reached a sufficient level, to actuate the float 10, which closes valve needle 11. Naturally, if the pressure in the cooling tank was equal to, or less than that, for which the relief valve 51 was set to relieve, beer could not enter the cooling tank, as there would be no means of escape for air in the tank because the relief valve would not open. When the float is down and the needle valve thus opened, air flows out through the plurality of grooves 12 and lifts ball 13, continues through passageways 15 and 16, then through a plurality of grooves 157, shown clearly in Fig. 22, it then enters hole 21 of plunger shaft 23, through a plurality of intersecting holes 20, then continues out through hole 162 in valve cap 26, then enters pipe line 28, the continuation of which said pipe line 28 is shown in Fig. 14. The air is lead through hole 98 of indicating element 94, which said number represents the indicator as a whole. The indicator has a needle valve which is manually operated. A part of needle shaft 104 is threaded, through which adjustments are effected by turning knob 105. Surrounding the needle shaft 104, is a stuffing box cap 102 and packing 103, which prevents leaks through needle shaft clearance. Normally the valve needle 104 is open, in which case escaping air continues to travel and passes through a plurality of small holes 112, as shown in Fig. 15. Said holes 112, reduce the force of escaping air. Numeral 99, indicates a glass cylinder, which is fastened in the body of indicating element 94 and serves as a container of water. The escaping air passing through holes 112, must continue through the quantity of water contained in the cylinder 99. As the air passes through the water 163, it produces bubbles 101, which serves as an indicating signal, which is both audible and visible. The air continues out of the cylinder 99, by way of a plurality of small holes 113, shown clearly in Fig. 16. Holes 113 are in cap 100. Said cap is retained in position by gravity. If the air was allowed to pass through one large hole instead of a plurality of small holes 112, the force would be sufficient to blow water out of the cylinder 99. After filling of cooling tank is completed, the needle valve 11 as in Fig. 1, closes and then the water in cylinder 99 of Fig. 14, will be at rest. This condition continues until the beer keg is completely empty. When this occurs, the level of beer in the cooling tank will drop and the float will cause valve needle 11 of Fig. 1, to open. Air will then flow from the beer keg, into the cooling tank as in Fig. 1 and pass through the beer, to the top of cooling tank as in Fig. 1, then pass through relief valve 51, into pipe line 28, a view of which is continued in Fig. 14, then through holes 98 and 112, through the water 163 and out through holes 113 of cap. Bubbles 101 are thereby produced, which furnishes a visible and an audible signal that indicates that a beer keg is empty. In Fig. 1, numeral 13 is a ball which rests on a valve seat. The ball 13 is guided and maintained in a concentric position over the outlet of needle valve 11, by a plurality of guide formations or ribs 16, which are an integral part of the shank of relief valve 51. When insufficient ice or other refrigerating means is used, the beer temperature will rise and when a certain point is reached, the beer will foam excessively and allow the float 10 to drop, which will consequently permit foam to enter the relief valve 51 and continue through to the indicator element 94. In time, the escaped foam will condense and then there is a possibility of same getting back into the cooling tank, which is not desirable. To prevent such a possibility, ball 13 forming a check valve is utilized. When the condition of excessive foaming is created, it will be necessary to close needle valve 104 of indicator, as shown in Fig. 14. The needle valve 104, should remain closed until the beer temperature is lowered and excessive foaming stopped, otherwise foam will continue to flow through indicator, with ultimate loss of beer.

In Fig. 14, when it is necessary to clean the glass cylinder 99, the cap 100 is lifted and the glass cylinder 99 can then be easily cleaned. To drain the glass cylinder 99, pet cock 109 is opened. The water then flows through the plurality of holes 112, shown clearly in Fig. 15, then in chamber of needle 104, then through passageway 107 and finally through pet cock 109. An additional outlet is through holes 110 and 111, shown clearly in Fig. 15. Said holes 110 and 111, are connected by a horizontal hole 108, which intersects hole 107. Hole 107 is concentrically located over opening in pet cock 109. Numeral 37 is the internal surface or wall of cooler box, also shown in Fig. 1. Numeral 139 is the exterior surface or wall of cooler box.

In Fig. 16 is shown a front view of the indicator as a whole. It is mounted on the exterior surface or wall 139 of a cooler box. The body is securely fastened to exterior surface or wall 139, by means of a plurality of screws 115. Numeral 116 indicates plugs, which closes the open ends of horizontal hole 108, clearly shown in Fig. 14.

In Fig. 1 is shown control element 30, which has a threaded shaft 32 and a head and valve seating shoulder 164 at each end. Boss 53, which is an integral part of cover 4 and is shown clearly in Fig. 5 has a recess at each end into which is fitted gaskets 31 and 68. This controller element 30, functions when the cooling tank is to be flushed or cleaned. By screwing controller element 30 downward, float 10 is maintained in a depressed position, which keeps valve needle 11 open. The gaskets 31 and 68 prevent the possibility of leakage.

To flush the cooling tank an empty keg or container is utilized. It is filled with warm water and bicarbonate of soda or some other flushing solution and pressure is applied the same as if beer was in the keg or container. It is essential that every part of the interior of cooling tank and the various valves and other elements thereof be washed and to accomplish this, the controller element 30 is screwed downward and pet cock 29, shown clearly in Fig. 2, is opened until solution passes through pet cock 29, at which time said pet cock 29 is closed, the controller element 30 is left screwed in downward position and a dispensing faucet is opened, which allows the flushing solution to pass through the complete system. When flushing is completed, the air flow is allowed to continue long enough to dry the system, after which controller element 30 is screwed in upward position, thus the float 10 will be free to function normally. If the pet cock 29 and controller element 30 were not utilized, the upper part of cooling tank and the various valves and other elements thereof, would not be flushed or washed, as the complete elimination of air from the system could not be accomplished under said condition.

In Fig. 7 is shown a detailed sectional view of needle valve elements. Numeral 62 is a boss integrally formed with cover 4. Numeral 165 is an enlarged portion of boss 62 and furnishes material for the needle valve chamber and the relief valve shank. Tie rods 49 support bracket 50. Numeral 77 indicates nuts for clamping bracket 50 in position. Numeral 166 indicate bracket arms, which are an integral part of bracket 50. Said arms 166 support shaft 72, which is retained in position by cotter pins being placed in holes 73, shown clearly in Fig. 8, the cotter pins being eliminated. Float arm 74 rotates on shaft 72, shown clearly in Fig. 8. The rotating movement is naturally a small part of a revolution. In Fig. 8, float 10 has a female threaded spud, into which a threaded shank 167 on float arm 74 fits. Float arm 74 carries two pivots 33, which supports valve needle 11, as shown in Fig. 9.

In Fig. 3 is shown a section, taken along line 3—3 of Fig. 1. Numeral 38 indicates a ring which furnishes an increased amount of surface, to which walls of tubes 8 can be soldered, as at 168. This is desirable in order to secure a firm grip on the cooling tubes 8. The plurality of flat surfaces on said ring 38, facilitates the placing and boring of holes, through which the cooling tubes 8 pass.

Lugs 47, which are an integral part of ring 38, form a substantial means for supporting clamp screws 34. The clamp brackets 35, which are shown in detail in Figs. 19, 20 and 21, are simple in construction and highly practical. In Fig. 20, serrated cuts 118 are clearly indicated. These serrated cuts 118, supply means for gripping, when clamping screws 34 are moved into clamping position. The arrangements as shown in Fig. 3, allow for variations in the several directions, as encountered when clamping a cooling tank into required position in a cooler box. The ring 38 is soldered to cooling tank cylinder of body 1, throughout the complete circumference thereof, which forms a rigid structure.

Figure 5:
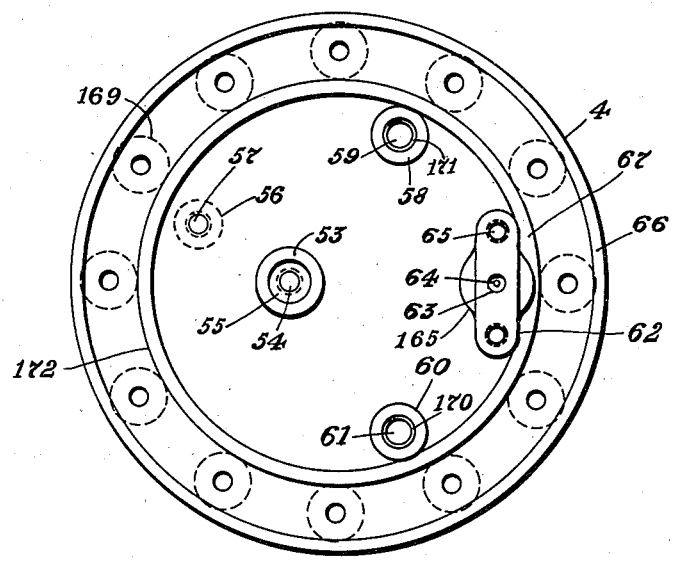
Figure 5 is a view of the bottom of cover 4, taken at line 5—5 of Fig. 1.

In Fig. 5 is shown the under surface of cover 4, as indicated at 5—5 in Fig. 1. In showing this detail, all component parts have been eliminated for explicit reasons. Numeral 169 indicates bosses on the upper surface of cover 4, upon which rests cap nuts 7, as shown in Fig. 2. Numeral 56 is a boss on the upper surface of cover 4. Numeral 57 is a threaded hole, into which fits a pet cock 29, shown in Figs. 1 and 2. Numeral 53 is a boss and 55 is a recess, into which a gasket 68 fits, as shown in Fig. 1. On the upper surface of cover 4, concentrically arranged over recess 55 and tapped hole 54, is a duplicate recess, into which gasket 31 fits, as shown in Fig. 1. Numeral 58 is a boss, which continues on the upper surface of cover 4, as at numeral 153 of Fig. 11. Numeral 59 is an opening through which beer enters the cooling tank. Numeral 171 is the shoulder of a counter-bored hole, against which rests inlet tube 82, as shown in Fig. 11. Said tube 82 is soldered into position. Numeral 60 is a boss for receiving the outlet tube 9, as shown in Fig. 1. Numeral 61 is a hole, through which beer flows out of the cooling tank. Numeral 170 is a shoulder of a counter-bored hole, against which rests outlet tube 9, as in Fig. 1. Said tube 9 is soldered into position. Concentrically formed over boss 60, on the upper surface of cover 4, is a boss duplicating 153, as shown in Fig. 11. Numeral 62 is a boss integrally formed with cover 4. Numeral 65 indicates tapped holes for receiving tie rods 49, shown clearly in Figs. 1 and 5. Numeral 63 is a valve needle chamber and 64 is a valve needle seat, clearly shown in Figs. 1 and 5. Concentrically formed on the upper surface of cover 4, over valve needle chamber 63 and valve seat 64, is a boss 154 arranged to receive threaded shank of relief valve 51, as shown clearly in Figs. 1 and 7. Numerals 66 and 67 are raised circular walls, between which fits a gasket. The circular wall 67 extends below the circular wall 66 and the outer edge of circular wall 67, indicated by numeral 172, clears edge 173 of Fig. 6 and extends below the top of surface 175 when assembled, as shown in Fig. 1.

Figure 6:
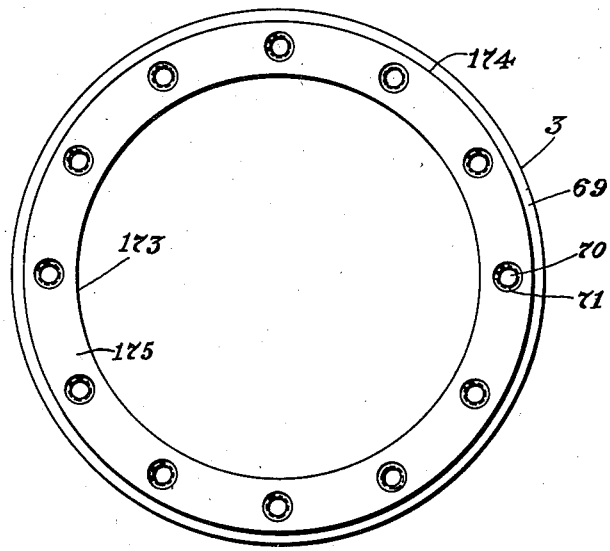
Figure 6 is a view of the lower face of the tank ring 3, taken at line 6—6 of Fig. 1. Said view is stripped of all component parts for explicit reasons.

In Fig. 6 is shown a cover clamping ring, with all component parts eliminated for explicit reasons. Tank cylinder 1 as shown in Fig. 1, is soldered to wall surface 174. The edge of tank cylinder 1 rests against shoulder 69. Numeral 70 indicates one of a plurality of tapped holes. Numeral 71 is a shoulder formed by counterboring, against which rests the under surface of stud heads 6, shown in Fig. 1. The heads of studs 6 are soldered into position.

In Fig. 22, is shown a transverse section through relief valve plunger 18 and the purpose of this view, is to make explicit, the arrangement of the plurality of air escaping grooves 157, which is shown in Fig. 1.

In Fig. 23 is shown a transverse section of relief valve, taken through the plurality of intersecting holes 20, as indicated in Fig. 1. The view is in the direction of valve end or towards passageways 16, as indicated in Fig. 1. This section shows valve plunger shaft 23, air passageway 21, plurality of intersecting air escaping holes 20, coil spring 19, lower section of sleeve 22 and a section through lower part of valve body 75.

Having described my invention, I claim as new and desire to secure by Letters Patent, the following:—

1. A beer cooling and dispensing apparatus of the character described, comprising a cooling tank arranged for receiving; conditioning and maintaining a constant supply of a liquid or beverage to be dispensed and provided with means to increase the cooling area of the said cooling tank and thus facilitate cooling of the contained liquid or beverage, comprising a single circular row of vertically placed open end cooling tubes interiorly located within the said cooling tank in spaced relation, said tubes being bent at their ends, the lower bent open ends of the said cooling tubes being securely fastened in corresponding holes in the lower portion of the cooling tank wall and the upper bent open ends of the said cooling tubes being securely fastened in corresponding holes in the upper portion of the cooling tank wall, thus forming a plurality of circulatory passages, through which cold water or a like refrigerant that surrounds the said cooling tank when in service, circulates due to temperature and density changes in the said cold water or a like refrigerant and consequently performs the function of transferring heat units from the liquid or beverage contained in the said cooling tank to the said cold water or a like surrounding refrigerant, an inlet tube for conveying liquid into said cooling tank, an outlet tube for dispensing liquid from said cooling tank.

2. A beer cooling and dispensing apparatus of the character described, comprising a cooling tank arranged for receiving; conditioning and maintaining a constant supply of a liquid or beverage to be dispensed and provided with means to increase the cooling area of the said cooling tank and thus facilitate cooling of the contained liquid or beverage, comprising a single circular row of vertically placed open end cooling tubes interiorly located within the said cooling tank in spaced relation, said tubes being bent at their ends, the lower bent open ends of the said cooling tubes being securely fastened in corresponding holes in the lower portion of the cooling tank wall and the upper bent open ends of the said cooling tubes being securely fastened in corresponding holes in the upper portion of the cooling tank wall, thus forming a plurality of circulatory passages, through which cold water or a like refrigerant that surrounds the said cooling tank when in service, circulates due to temperature and density changes in the said cold water or a like refrigerant and consequently performs the function of transferring heat units from the liquid or beverage contained in the said cooling tank to the said cold water or a like surrounding refrigerant, an inlet tube for conveying liquid into said cooling tank, an outlet tube for dispensing liquid from said cooling tank, means for preventing back flow of liquid contained in the said cooling tank comprising therefor a ball check valve mounted on the end of said inlet tube, the body of which is cuplike in shape and is provided with a plurality of vertical guide formations or ribs integrally formed thereon, for providing a minimum of contact surface and controlling concentricity of the valve ball, the vertical movement of which is controlled by a pin, diametrically placed in corresponding holes formed in the wall structure of said check valve body, the said pin being located directly above and in spaced relation to said valve ball.

3. A beer cooling and dispensing apparatus of the character described, comprising a cooling tank arranged for receiving; conditioning and maintaining a constant supply of a liquid or beverage to be dispensed and provided with means to increase the cooling area of the said cooling tank and thus facilitate cooling of the contained liquid or beverage, comprising a single circular row of vertically placed open end cooling tubes interiorly located within the said cooling tank in spaced relation, said tubes being bent at their ends, the lower bent open ends of the said cooling tubes being securely fastened in corresponding holes in the lower portion of the cooling tank wall and the upper bent open ends of the said cooling tubes being securely fastened in corresponding holes in the upper portion of the cooling tank wall, thus forming a plurality of circulatory passages, through which cold water or a like refrigerant that surrounds the said cooling tank when in service, circulates due to temperature and density changes in the said cold water or a like refrigerant and consequently performs the function of transferring heat units from the liquid or beverage contained in the said cooling tank to the said cold water or a like surrounding refrigerant, an inlet tube for conveying liquid into said cooling tank, an outlet tube for dispensing liquid from said cooling tank, an air and water bubbling signal for indicating the existence of an empty beer keg or beverage container, in the form of an indicating transparent water receptacle mounted on the exterior wall of a cooler box, the indicating transparent water receptacle being connected by a tube line to a float controlled air relief valve exteriorly mounted on the detachable cover of the cooling tank, the body of the said indicating transparent water receptacle being provided with one or more passageways, through which air escapes from the float controlled air relief valve and passes through water contained in the indicating transparent water receptacle.

4. A beer cooling and dispensing apparatus of the character described, comprising a cooling tank arranged for receiving; conditioning and maintaining a constant supply of a liquid or beverage to be dispensed and provided with means to increase the cooling area of the said cooling tank and thus facilitate cooling of the contained liquid or beverage, comprising a single circular row of vertically placed open end cooling tubes interiorly located within the said cooling tank in spaced relation, said tubes being bent at their ends, the lower bent open ends of the said cooling tubes being securely fastened in corresponding holes in the lower portion of the cooling tank wall and the upper bent open ends of the said cooling tubes being securely fastened in corresponding holes in the upper portion of the cooling tank wall, thus forming a plurality of circulatory passages, through which cold water or a like refrigerant that surrounds the said cooling tank when in service, circulates due to temperature and density changes in the said cold water or a like refrigerant and consequently performs the function of transferring heat units from the liquid or beverage contained in the said cooling tank to the said cold water or a like surrounding refrigerant, an inlet tube for conveying liquid into said cooling tank, an outlet tube for dispensing liquid from said cooling tank, and air and water bubbling signal for indicating the existence of an empty beer keg or beverage container, in the form of an indicating transparent water receptacle mounted on the exterior wall of a cooler box, the indicating transparent water receptacle being connected by a tube line to a float controlled air relief valve exteriorly mounted on the detachable cover of the cooling tank, the body of the said indicating transparent water receptacle being provided with one or more passageways, through which air escapes from the float controlled air relief valve and passes through water contained in the indicating transparent water receptacle, means for draining a liquid or beverage from the cooling tank, comprising therefor a needle valve incorporated in the body of the indicating transparent water receptacle, whereby the escape of air through the indicating transparent water receptacle can be prevented by closing the said needle valve and thereby render effective the regular operation of a dispensing faucet.

THOMAS A. JENKINS.